Figure 1:
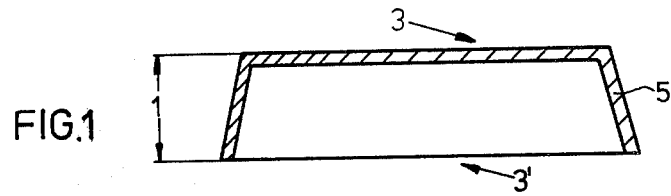

United States Patent [19]

Sanderson et al.

[11] 4,338,406

[45] Jul. 6, 1982

[54] HIGH-IMPACT POLYAMIDE MOULDING COMPOSITIONS

[75] Inventors: John R. Sanderson, Austin, Tex.; Rudolf Binsack; Friedrich Fahnler, both of Krefeld, Fed. Rep. of Germany; Christian Lindner, Cologne, Fed. Rep. of Germany

[73] Assignee: Bayer Aktiengesellschaft, Leverkusen, Fed. Rep. of Germany

[21] Appl. No.: 283,824

[22] Filed: Jul. 16, 1981

Related U.S. Application Data

[63] Continuation of Ser. No. 194,772, Oct. 7, 1980, abandoned.

[30] Foreign Application Priority Data

Oct. 10, 1979 [DE] Fed. Rep. of Germany ....... 2941025

[51] Int. Cl.$^3$ .............................................. C08L 77/00
[52] U.S. Cl. ....................................... 525/66; 525/183
[58] Field of Search ................................. 525/66, 183

[56] References Cited

U.S. PATENT DOCUMENTS 3,700,751 10/1972 Mueller ............................... 525/183
4,221,879 9/1980 Humme ................................ 525/66

Primary Examiner—Paul Lieberman
Attorney, Agent, or Firm—Connolly and Hutz

[57] ABSTRACT

High impact resistant optionally reinforced moulding compositions consisting of polyamide and a graft product of polybutadiene and grafted units of t-butyl acrylate and an acrylic acid ester with 1–4 C-atoms in the alcoholic moiety.

5 Claims, 3 Drawing Figures

HIGH-IMPACT POLYAMIDE MOULDING COMPOSITIONS

CROSS REFERENCE TO RELATED APPLICATION

This application is a continuation of application Ser. No. 194,772, filed Oct. 7, 1980, and now abandoned.

This invention relates to thermoplastic polyamide moulding compositions having improved impact strength and breakage-resistance coupled with improved weather-resistance and thermal stability.

In their dry state, mouldings of polyamides lack the strength required for many applications. There are numerous possible methods for improving their toughness, the most simple of which is based on the uptake of water. However, on account of the laboriousness of this conditioning process which, in addition, gives products having varying properties on account of its dependence upon external conditions, various proposals have been put forward with a view to improving the toughness of polyamides even in their dry state by the incorporation of certain modifiers.

Thus, according to German Offenlegungsschrift No. 2,742,176, the impact strength and notched impact strength of polyamides are increased by the addition of graft copolymers of (meth)acrylic acid derivatives, particularly (meth)acrylic acid esters, on crosslinked polybutadienes.

It has now surprisingly been found that a particularly distinct improvement in impact strength and particularly in multiaxial impact strength can be obtained by modifying the polyamides with graft products based on crosslinked polybutadienes containing as the grafted units a mixture of t-butyl acrylate and an ester of acrylic acid with a $C_1$–$C_4$-primary or secondary alcohol.

Accordingly, the present invention provides moulding compositions comprising

I: from 50 to 99% by weight, preferably from 60 to 97% by weight and, more particularly, from 70 to 95% by weight of polyamides having a relative viscosity (as measured on a 1% by weight solution in m-cresol at 25° C.) of from 2.5 to 5.0 and preferably from 2.8 to 4.5; and II: from 1 to 50% by weight, preferably from 3 to 40% by weight and, more particularly, from 5 to 30% by weight of graft product produced from (a) 70 to 95% by weight, preferably from 75 to 90% by weight and, more particularly, from 80% by weight of a crosslinked polymer of butadiene and/or substituted butadiene, of which up to 5% by weight may optionally consist of styrene and/or an ester of (meth)acrylic acid, as the graft substrate; and (b) 5 to 30% by weight, preferably from 10 to 25% by weight and, more particularly, from 20% by weight of (meth)acrylates as the graft monomer, characterised in that the graft monomers are a mixture of (1) from 70 to 95% by weight, preferably from 75 to 90% by weight and, more particularly, from 75 to 85% by weight of an ester of acrylic acid with a primary or secondary alcohol containing from 1 to 4 carbon atoms, preferably n-butyl acrylate, and (2) from 5 to 30% by weight, preferably from 10 to 25% by weight and, more particularly, from 15 to 25% by weight of the t-butyl ester of (meth)acrylic acid, the sum of I and II, the sum of (a) and (b) and the sum of (1) and (2) amounting respectively to 100% by weight.

Suitable polyamides for the moulding compositions according to the invention are polyamide-6, polyamide-6,6 mixtures of block copolymers of these two components and copolymers of caprolactam, adipic acid and hexamethylene diamine. Other suitable polyamides are polyamides of which the acid component consists completely or partly of terephthalic acid and/or isophthalic acid and/or suberic acid and/or sebacic acid and/or azelaic acid and/or cyclohexane dicarboxylic acid, and of which the diamine component consists completely or partly of m- and/or p-xylylene diamine and/or 2,2,4-trimethyl hexamethylene diamine and/or 2,4,4-trimethyl hexamethylene diamine and/or isophorone diamine.

It is also possible to use polyamides which have been completely or partly produced from lactams containing from 7 to 12 carbon atoms, optionally using one or more of the starting components just mentioned.

Preferred polyamides are polyamide-6 and polyamide-6,6. The relative viscosity of the polyamides used, as measured on a 1% by weight solution in m-cresol at 25° C., should be in the range of from 2.5 to 5.0 and preferably in the range of from 2.8 to 4.5.

Diene rubbers based on polybutadiene and/or polyisoprene which may contain up to 5% by weight of styrene and/or esters of (meth)acrylic acid, such as methyl or ethyl(meth) acrylate as comonomer, are used as the graft substrate in the production of the graft products. The polymer used as graft substrate should have a gel content of $\geq 70\%$ by weight and preferably $\geq 80\%$ by weight (as measured in toluene).

The preferred graft substrate consists of polybutadiene.

Preferred graft monomers are esters of acrylic acid, such as ethyl or n-butyl acrylate, tert.-butyl (meth)acrylate. The preferred graft monomer mixture is n-butyl and t-butyl acrylate.

The graft products according to the invention may be produced by any known polymerisation process (such as emulsion, solution, bulk, suspension and precipitation polymerisation) and by combinations of these processes.

To produce the graft products, the monomers to be grafted on are polymerised in the presence of the preformed graft substrate. In addition to the actual graft polymer, free homopolymers and copolymers of the graft monomers are also formed. In the context of this invention, graft products are understood to be the sum total of the actual graft copolymers and the free polymers. The quantity of monomers grafted on, their molecular weight and the composition of the grafted monomers may be influenced within wide limits by varying the polymerisation conditions. These include, in particular, the type of polymerisation process used, the temperature, the activator system, the molecular weight regulator, the stirring conditions and the method used to introduce the monomer. According to this invention, the graft yield G should amount to $\geq 0.4$, preferably to $\geq 0.6$ and, with particular preference to $\geq 0.8$. The graft yield G represents the quantitative ratio of acrylate and t-butyl (meth)acrylate grafted on, to the total quantity of the monomers to be grafted and is dimensionless.

The preferred polymerisation process for the graft polymers according to the invention is emulsion polymerisation.

Crosslinked butadiene polymers, preferably obtained by emulsion polymerisation, are preferably used as graft substrate where the graft products are produced by emulsion polymerisation. According to this invention, it is preferred to use graft products which have a "mean particle diameter" $d_{50}$ of from 0.2 to 0.5 μm, preferably from 0.3 to 0.5 μm and, more particularly, of the order of 0.4 μm. (For determination of the "mean particle diameter", see W. Scholtan and H. Lange, Kolloid Z. and Z. Polymere 250 (1972 782–796 and G. Kampf, H. Schuster, Angew. Makromolekulare Chemie 14 (1970), pages 111–129).

For producing the moulding compositions according to this invention, it is advantageous to use the above-mentioned graft monomers in a certain ratio. According to the invention, the mixture preferably consists of
from 70 to 95% by weight, preferably from 75 to 90% by weight and, more particularly, from 75 to 85% by weight of an ester of acrylic acid with a primary or secondary alcohol containing from 1 to 4 carbon atoms, preferably n-butyl acrylate, and
from 5 to 30% by weight and preferably from 10 to 25% by weight of the t-butyl ester of (meth)acrylic acid.

Instead of using only one graft substrate, mixtures of different graft bases may also be used for producing the graft products. In addition, instead of using only one graft product, it is also possible according to the invention to use mixtures of several graft products with different compositions for admixture with the polyamides.

The polyamide moulding compositions according to the invention may be produced in the usual mixing units, such as mixing rolls, kneaders, single-screw and multiple-screw extruders. Twin-screw extruders are particularly suitable.

The moulding compositions may be produced in the above-mentioned mixing units by melting and homogenising components I and II or by working graft copolymer II into the melt of polyamide I.

The temperature at which the moulding compositions are produced should be at least 10° C. above the melting point of polyamide I and below 310° C. and preferably in the range of from 260° C. to 300° C.

Mixing of the polyamide and graft product may be accompanied by a grafting reaction between the two components. The degree of grafting, i.e. the ratio of graft product II grafted onto the polyamide to the total graft product II, may be determined by preparative fractionation with non-miscible solvents (cf. R. Kuhn, Makromol. Chem. 177, (1976), 1525 et seq). In the particularly high-impact moulding compositions according to the invention, the degree of grafting P of the graft product II onto the polyamide amounts to $\geq 0.4$ and preferably to $\geq 0.5$.

Even with low contents of graft product II, the moulding compositions according to the invention are distinguished by a considerable improvement in their impact strength and particularly in their multiaxial impact strength. High flow line strength is another surprising property of the moulding compositions according to this invention. In addition, the moulding compositions according to the invention are characterised by outstanding stability to thermooxidative ageing and to the effect of weather conditions (Weather-O-Meter test).

The moulding compositions according to the invention may contain standard additives, such as lubricants and mould-release agents, nucleating agents, stabilisers, flameproofing agents and dyes. These optional additives are introduced in pure form or as concentrates, preferably during the compounding of the moulding compositions.

When reinforcing materials, such as fibres and, particularly glass fibres, are added to the moulding compositions according to the invention, unexpectedly high impact and notched impact strength are observed, particularly in the event of multiaxial impact stressing.

Accordingly, the present invention also provides polyamide moulding compositions according to the invention which contain:

III: from 10 to 60% by weight, preferably from 15 to 50% by weight and, more particularly, from 20 to 40% by weight, based on the total moulding composition, of reinforcing materials, preferably fibres, particularly glass fibres. The fibres preferably have a diameter of from 8 to 14 μm.

Instead of or in combination with the glass fibres, the moulding compositions according to the invention may also contain other fillers or reinforcing materials, for example glass beads, asbestos, talcum, kaolin, wollastonite, Microvit, mica or chalk.

The reinforcing materials may be worked in by standard methods, preferably in twin-screw extruders, for example
(a) by the common incorporation of polyamide I, graft product II and reinforcing component III,
(b) by the incorporation of reinforcing component III into the moulding composition of I and II,
(c) by the common incorporation of polyamide I and graft product II with fusion and the subsequent incorporation of reinforcing component III, or
(d) by the common incorporation of graft product II and reinforcing component III into optionally fused polyamide I.

Preferred processes are variants (c) and (d).

As already mentioned, the reinforced polyamide moulding compositions are distinguished by an unexpectedly marked improvement in all toughness properties, particularly in toughness under multiaxial impact stressing, without other mechanical properties, such as flexural strength and rigidity, being significantly impaired. Accordingly, the reinforced polyamide moulding compositions are eminently suitable for the production of mouldings of the type subjected to severe impact stressing, for example for the production of drilling machine housings and shock absorbers.

EXAMPLES

Production of the graft product

A solution of 80 parts by weight of salt-free water, 1.5 parts by weight of the sodium salt of disproportionated abietic acid and 0.3 parts by weight of potassium peroxy disulphate is introduced into a pressure-tight, stirrer-equipped vessel. After the air has been displaced by nitrogen and the internal temperature has been adjusted to 55° C., 0.35 part by weight of dodecyl mercaptan and A parts by weight of butadiene are added and polymerisation beings. As the reaction velocity falls with the progress of polymerisation, the temperature is slowly increased to 68° C.

On completion of polymerisation, small quantities of the unreacted butadiene are removed by stirring the latex obtained under reduced pressure.

175 parts by weight of deionised water and 0.3 parts by weight of potassium peroxy disulphate are added.

After the air has been displaced by nitrogen, followed by heating to 65° C., 2 parts by weight of emulsifier (sodium salt of disporportionated abietic acid or alkyl sulphates), dissolved in 25 parts by weight water, and a mixture of the graft monomers n-butyl acrylate and t-butyl acrylate (B and C parts by weight; s. Table 1), are added.

The addition time is approximately 4 hours. To complete the reaction, the reaction mixture is stirred for another 2 hours at 65° C. on completion of the addition.

Following the addition of 1 part by weight of a phenolic anti-oxidant (2,6-di-tert.-butyl-p-cresol), the graft product latex thus obtained is coagulated with 2% $MgSO_4$/acetic acid solution (mixing ratio 1:1 parts by weight), after which the coagulate is separated off, washed free from salt and dried in vacuo at 70° C.

In order to assess processability, the flow length was also determined (injection into a spiral die having a rectangular spiral cross-section of 4×2.5 mm under constant working conditions: melt temperature, mould temperature, injection pressure, dwell pressure).

In addition, the degree of grafting P of the mixtures was determined. The degree of grafting P is characterised as follows:

$$P = \frac{\text{quantity of graft product grafted onto the polyamide}}{\text{Total quantity of graft product}} \cdot 100$$

The composition and properties of the non-reinforced moulding compositions are shown in Table 2.

TABLE 2

Composition and properties of the non-reinforced polyamide moulding compositions

| Example No. | Graft product type | Graft product % by weight | Polyamide type$\eta_{rel}$[1] | % by weight | Notched impact strength kJ/m² 20° C. | Notched impact strength kJ/m² −40° C. | Flow length cm | Degree of grafting P |
|---|---|---|---|---|---|---|---|---|
| 1 | L | 10 | PA-6 3.95 | 90 | 28.3 | 9.5 | 35 | 88 |
| 2 | L | 20 | PA-6 3.95 | 80 | 69.7 | 15.4 | 25 | 82 |
| 3 | J | 20 | PA-6 3.95 | 80 | 55.5 | 14.7 | 26 | 72 |
| 4 | J | 30 | PA-6 3.95 | 70 | 44.3 | 13.2 | 16 | 58 |
| 5 | J | 40 | PA-6 3.95 | 60 | 30.2 | 12.7 | 15 | 51 |
| 6 | K | 30 | PA-6 3.95 | 70 | 48.7 | 13.8 | 15 | 62 |
| 7 | L | 30 | PA-6 3.95 | 70 | 53.6 | 14.4 | 15 | 64 |
| 8 | M | 30 | PA-6 3.95 | 70 | 54.6 | 14.5 | 14 | 67 |
| 9 | L | 30 | PA-6 2.92 | 70 | 35.9 | 12.5 | 35 | 66 |
| 10 | N | 30 | PA-6 2.92 | 70 | 37.8 | 12.8 | 36 | 64 |
| 11 | O | 30 | PA-6 2.92 | 70 | 20.2 | 10.2 | 38 | 52 |
| 12 | L | 20 | PA-6,6 3.98 | 80 | 52.3 | 14.5 | 24 | 81 |

[1]$\eta_{rel}$ viscosity, as measured on a 1% solution in m-cresol at 25° C. in an Ubbelohde viscosimeter.

The composition of the graft products is shown in the following Table 1.

TABLE 1

Composition of the graft products

| No. | Graft substrate A parts by weight of butadiene | Graft unites B parts by weight of n-butyl acrylate | C parts by weight of t-butyl acrylate | Mean particle diameter μm | Graft yield G |
|---|---|---|---|---|---|
| J | 80 | 19 | 1 | 0.4 | 0.93 |
| K | 80 | 18 | 2 | 0.4 | 0.94 |
| L | 80 | 16 | 4 | 0.4 | 0.95 |
| M | 80 | 14 | 6 | 0.4 | 0.96 |
| N | 90 | 8 | 2 | 0.4 | 0.97 |
| O | 95 | 4 | 1 | 0.4 | 0.97 |

Production of non-reinforced moulding compositions of graft product and polyamide (Examples 1 to 12)

Graft products J to O were worked into polyamide in a standard, continuous twin-screw extruder of the ZSK 32 type manufactured by Werner & Pfleiderer, in which the polyamide had been melted beforehand.

The graft product was introduced into the polyamide melt through a second inlet. It is advisable to establish a nitrogen atmosphere. The graft product was melted and homogeneously distributed in the polyamide. It can be advantageous to degas the melt before it issues from the die. The barrel temperatures were adjusted to guarantee a melt temperature of 280° C. to 290° C. The melt strand of the mixture of polyamide and graft product was cooled in water, granulated and dried. Standard small test bars (corresponding to DIN 53 453) were injection-moulded from the granulate at 260° C. in a standard injection-moulding machine.

Notched impact strength was tested at room temperature and at −40° C. (in accordance with DIN 53 453).

Production of reinforced moulding compositions of graft product and polyamide (Examples 13 to 18)

Polycaprolactam having a relative viscosity of 3.1, as measured on a 1% by weight solution in m-cresol at 25° C., and graft product L together with the usual quantity of nucleating agents and mould-release agents having the composition indicated in Table 3 were melted at 250° to 280° C. in a single-screw extruder (16 mm in diameter, 1500 mm long with shearing and mixing elements). Glass fibres in the form of "chopped strands" were worked into the melt so that the resulting mixture extruded in strand form through a die contained approximately 30% by weight of glass fibres. The strands were cooled in a water bath, granulated and dried. The granulate was injection-moulded into test specimens. The injection-moulded test specimens were tested dry in their freshly injected state.

The mechanical properties were assessed by measuring impact strength and notched impact strength (according to DIN 53 453), damage work by the multiaxial impact test (according to DIN 53 443) and flexural strength (according to DIN 53 452).

Experience has shown that the impact strength of fibre-reinforced materials depends to a large extent on the degree of orientation of the fibres. In the injection-moulded test specimens for the impact strength test according to DIN 53 453, the glass fibres are oriented to a large extent in the flow direction, i.e. parallel to the length of the test specimen. The impact is applied transversely of the flow direction (transversely of the fibre direction). It is for this reason that higher impact strength values are measured with increasing glass fibre content. Along the direction of flow (fibre direction), however, impact strength is distinctly lower.

Figure 3:
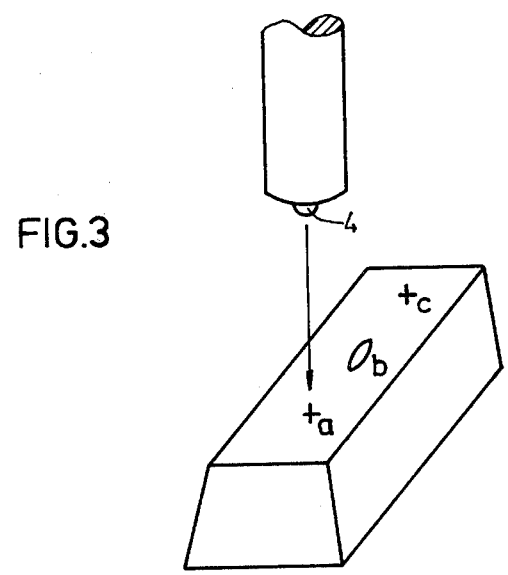

Experience has shown that a better picture of the toughness of reinforced polyamides under impact stressing is provided by the impact or falling-bolt test according to DIN 53 443, as illustrated in FIG. 3. In this Figure, the ball 4 has a radius of 25 mm (a) represents the point of impact of the ball,
(b) represents the sprue (diameter approximately 4 mm) in the middle of the base and
(c) represents a test point parallel to (a).

Figure 2:
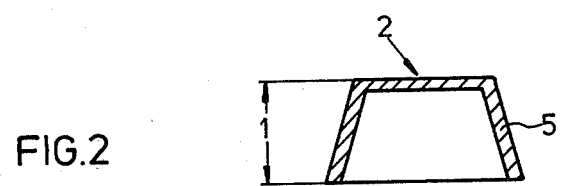

However, it is essential that the test specimens should have as low a degree of orientation as possible, for example like the test box shown in FIGS. 1 and 2 which has a height 1 of 40 mm, a width 2 of 46.7 mm and a length 3 of 106.7 mm or 3' of 120 mm and a wall thickness 5 of 1.5 mm.

The composition and properties of the reinforced polyamide moulding compositions are shown in Table 3.

TABLE 3

Composition and properties of the reinforced polyamide moulding compositions

| Example No. | Graft product L % by weight[2] | % by weight[2] dye[1] | Impact strength kJ/m$^2$ | Notched impact strength kJ/m$^2$ | Damage work to the box N·m | Flexural strength MPa |
|---|---|---|---|---|---|---|
| 13 | 3 | — | 56.8 | 15.2 | 2.9 | 235 |
| 14 | 5 | — | 57.7 | 16.5 | 4.2 | 230 |
| 15 | 10 | — | 63.0 | 20.0 | 8.5 | 228 |
| 16 | 15 | — | 68.0 | 28.3 | 18.3 | 211 |
| 17 | 3 | 0.5 | 49.8 | 12.4 | 2.8 | 236 |
| 18 | 5 | 0.5 | 52.6 | 15.1 | 3.5 | 232 |

[1]Ultramarine and cadmium pigments
[2]based on the moulding composition as a whole

We claim:

1. A moulding composition comprising
   I. from 50 to 99% by weight of polyamides having a relative viscosity (as measured on a 1% by weight solution in m-cresol at 25° C.) of from 2.5 to 5.0 and
   II. from 1 to 50% by weight of graft product produced from
     (a) 70 to 95% by weight of a crosslinked polymer of butadiene and/or substituted butadiene, of which up to 5% by weight may optionally consist of styrene and/or an ester of (meth)acrylic acid, as the graft substrate and
     (b) 5 to 30% by weight of (meth)acrylates as graft monomer, characterised in that the graft monomers are a mixture of
       (1) from 70 to 95% by weight of an ester of acrylic acid with a primary or secondary alcohol containing from 1 to 4 carbon atoms and
       (2) from 5 to 30% by weight of the t-butyl ester of acrylic acid and/or methacrylic acid the sum of I and II, the sum of (a) and (b) and the sum of (1) and (2) are to amount to 100% by weight.

2. A moulding composition as claimed in claim 1 containing from 10 to 60% by weight, based on the moulding compositions as a whole, of reinforcing materials.

3. A moulding composition as claimed in claim 2 containing glass fibres.

4. A moulding composition as claimed in claim 1, containing from 75 to 90% by weight of component (1), and from 10 to 25% by weight of component 2.

5. A moulding composition as claimed in claim 1, containing as grafted units a mixture of t-butyl acrylate and n-butyl acrylate.

* * * * *